No. 890,724. PATENTED JUNE 16, 1908.
A. M. STOCKING.
COLLAPSIBLE STRAINER FOR FRUIT, &c.
APPLICATION FILED OCT. 24, 1907.

WITNESSES:
Max B. A. Doring.
L. L. Browning.

INVENTOR
Amy M. Stocking
BY
Edward C. Davidson
ATTORNEY

UNITED STATES PATENT OFFICE.

AMY M. STOCKING, OF EAST ORANGE, NEW JERSEY.

COLLAPSIBLE STRAINER FOR FRUIT, &c.

No. 890,724.  Specification of Letters Patent.  Patented June 16, 1908.

Application filed October 24, 1907. Serial No. 398,893.

*To all whom it may concern:*

Be it known that I, AMY M. STOCKING, a citizen of the United States, residing at East Orange, county of Essex, State of New Jersey, have invented a new and useful Collapsible Strainer for Fruit, &c., of which the following is a specification.

The purpose of this invention is to provide a foldable frame adapted, when extended for use, to carry a flexible or cloth fruit strainer and to inclose a vessel into which the juice of the fruit dropping from the strainer may fall.

The device is provided with a flexible envelop surrounding and covering the entire apparatus and protecting the fruit from dust, etc.

Figure 1:
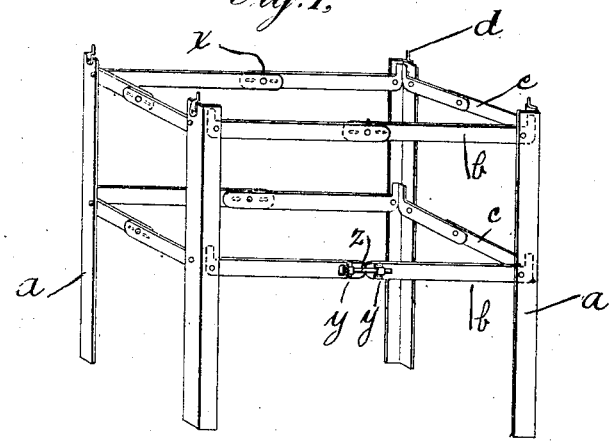
Figure 2:
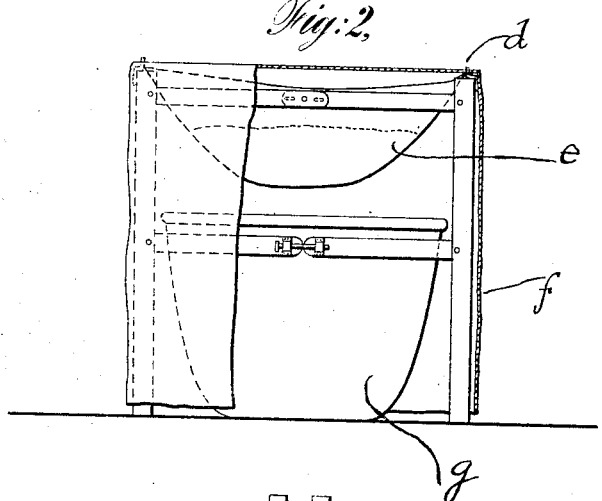
Figure 3:
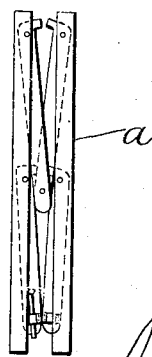

In the drawing: Figure 1 is a perspective view showing the frame extended for use: Fig. 2 a view partly in elevation, with the envelop broken away, showing all the parts: and Fig. 3 shows the frame folded.

The frame is composed of four end posts $a$, preferably of light angle iron. To the inner faces of each post are pivoted four arms $b$, $b$, $c$, $c$, those $b$ being disposed at right angles to those $c$ and the two of each pair being properly spaced. The frame when extended will be square in plan and the free ends of corresponding arms $b$, $b$, $c$, $c$ are jointed together as at $x$. This is true of all of the pivoted arms except two, preferably two lower ones, whose contiguous ends are formed with ears $y$, $y$ to receive a bolt $z$ serving to hold the arms in horizontal position as in Fig. 1. When this retaining bolt is removed, the frame may be folded as indicated in Fig. 3; or these two arms may be dropped down to permit insertion or removal of the vessel $g$. At the top of each post projects a pin $d$ over which pass eyelet holes at the four corners of a muslin straining bag $e$. A rectangular envelop $f$ made of light canvas or other appropriate fabric, open at the bottom and entirely continuous at the sides and also at the top, except that in the top are formed four eyelet holes to fit over the pins $d$. Below the straining bag and within the structure there may be placed a receiving vessel $g$, the straining bag being suspended centrally of the structure and over the receiving vessel $g$ by means of the pins $d$. The cover or envelop $f$ may be dragged in position as in Fig. 2 all parts of the apparatus being then substantially closed and the fruit, and the juice therefrom, protected from dust, flies, etc.

I claim:

A fruit strainer comprising a collapsible frame composed of posts $a$ and pairs of arms $b$, $b$, $c$, $c$, pivoted to the respective posts, pivotal connections between contiguous ends of corresponding arms, a strainer bag having means of suspension from the upper parts of the post and a protecting envelop or fabric inclosing the top and sides of the frame and suspended from the upper ends of the posts.

In testimony whereof, I have hereunto subscribed my name.

AMY M. STOCKING.

Witnesses:
CHARLES M. WESTERVELT,
C. A. WESTERVELT,